June 5, 1923.
F. W. BENDER
POTATO BUG AND APHIS EXTERMINATOR
Filed Aug. 19, 1922 2 Sheets-Sheet 1
1,457,420
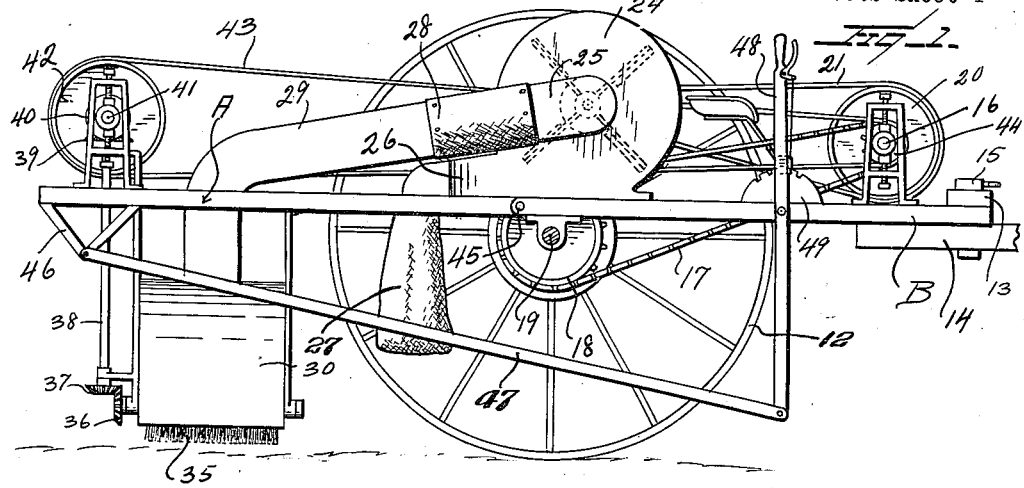
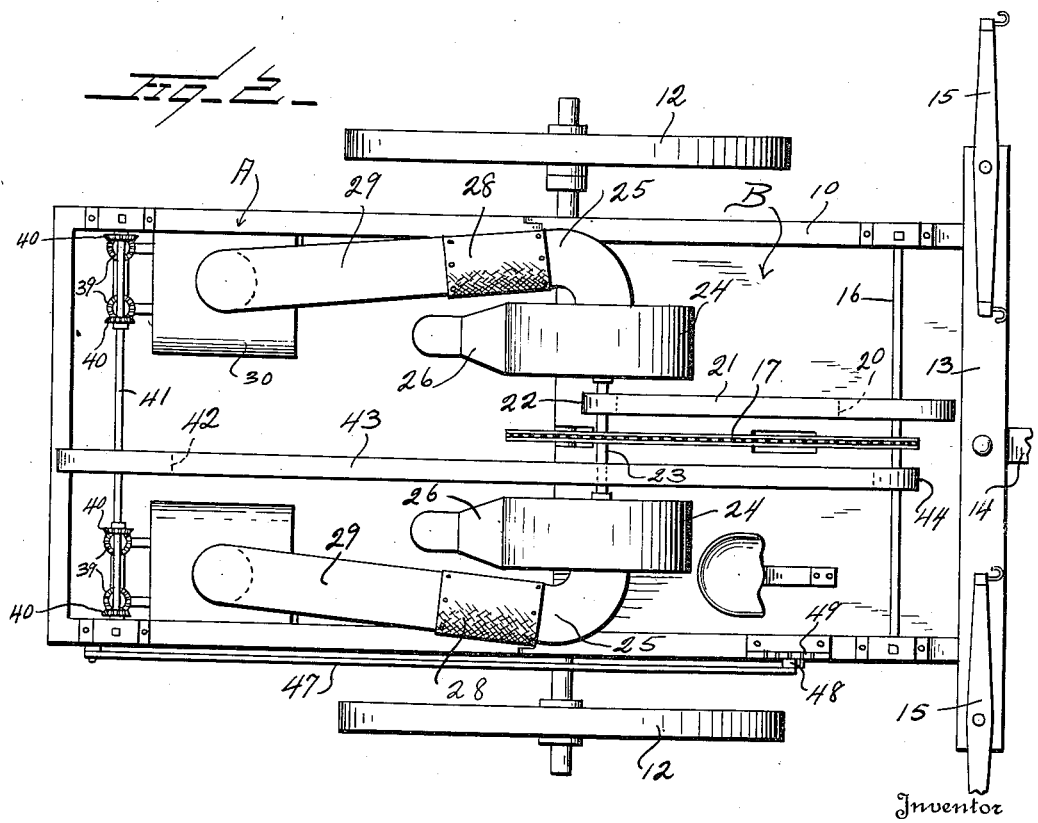
Inventor
F. W. Bender
By Watson E. Coleman
Attorney

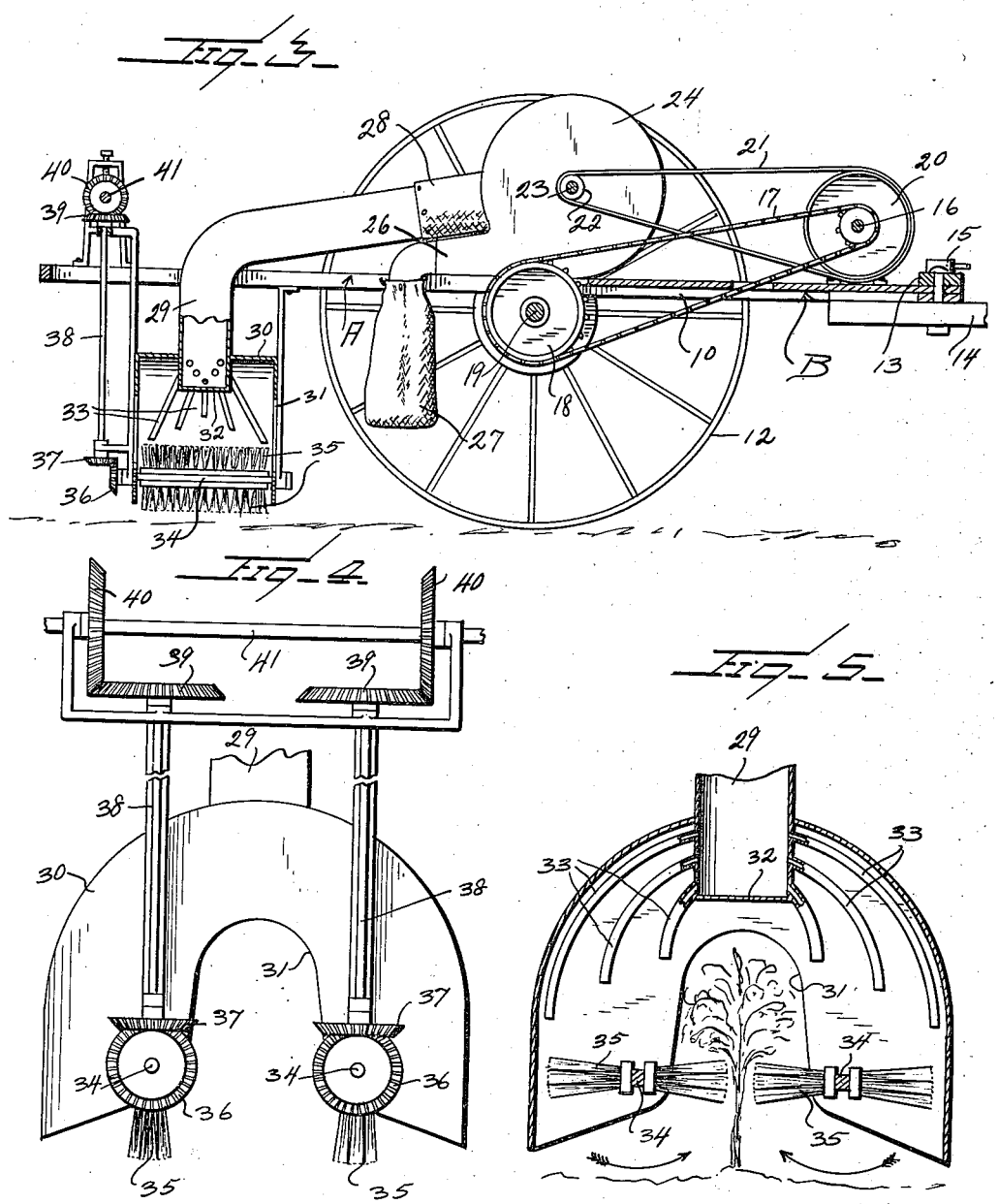

Patented June 5, 1923.

1,457,420

UNITED STATES PATENT OFFICE.

FREDERICK W. BENDER, OF CAPE CHARLES, VIRGINIA.

POTATO BUG AND APHIS EXTERMINATOR.

Application filed August 19, 1922. Serial No. 582,943.

*To all whom it may concern:*

Be it known that I, FREDERICK W. BENDER, a citizen of the United States, residing at Cape Charles, in the county of Northampton and State of Virginia, have invented certain new and useful Improvements in Potato Bug and Aphis Exterminators, of which the following is a specification, reference being had to the accompanying drawings.

This invention relates to devices for destroying insects, and particularly to insect destroyers which are adapted to be drawn over the plants in a field and remove the insects therefrom.

The general object of this invention is to provide a destroyer of this character wherein the insects are detached from the plants by agitating the plants and are then drawn by suction off from the plants into a collecting bag or receptacle.

A further object is to provide means which will brush the insects from the plants into the air, where they may be drawn off by suction, which means will not injure the plants but will simply brush the insects thereoff.

A still further object is to provide a device of this character wherein brushing devices are entirely enclosed within a hood beneath which the plant is located at the time the brushing operation takes place, and provide a plurality of suction pipes opening into said hood at various points therein so that the insects detached by the brushes and thrown into the air through the hood will be thrown to the suction pipes and drawn into the collecting receptacle.

Another object is to provide a device of this character which is adapted to operate on two rows of potatoes or other plants at the same time, and in which power for operating the suction fans and brushes is secured from the traction wheels of the machine.

Other objects will appear in the course of the following description.

My invention is illustrated in the accompanying drawings, wherein:—

Figure 1 is a side elevation of a machine constructed in accordance with my invention;

Figure 2 is a top plan view of the construction shown in Figure 1;

Figure 3 is a longitudinal sectional view through the middle of the machine approximately on the line of draft, the suction pipe and hood on one side being broken away;

Figure 4 is a rear end elevation of the hood;

Figure 5 is a vertical sectional view of the hood, the section being taken transverse to the longitudinal axis of the machine.

Referring to these drawings, 10 designates a rectangular frame of any suitable construction, and mounted upon an axle 19 which is supported by means of the wheels 12. The front of the frame is formed by a bar 13 having a tongue 14 extending therefrom and provided with the usual singletrees 15 or other draft devices.

Mounted upon the forward end of the frame is a counter-shaft 16 driven by a sprocket chain 17 engaging a sprocket wheel 18 mounted upon the axle 19. This shaft 16 carries upon it a band wheel 20 from which a band or belt 21 extends around a band wheel 22 mounted upon a shaft 23 extending transversely to the machine. Supported upon the frame in any suitable manner are the fan casings 24 each containing a suction fan mounted upon the shaft 23 and rotating in a direction to withdraw air from the trunk 25 and discharge the air through an outlet branch 26 which is adapted to be connected to collecting bags 27 or other receptacles. Each trunk 25 is connected by a flexible connection 28 to a suction pipe 29 which extends rearward and then downward and enters a transversely curved hood 30. This hood has front and rear walls which are cut away, as at 31, to straddle the plant, as shown in Figure 5.

The suction pipe 29 extends down into this hood and is closed at its lower end by a cap 32 and has extending from it a plurality of suction pipes 33. These suction pipes extend downward into the hood at various levels and to different positions within the hood but, of course, are so located as not to strike the plants.

Extending through each hood are a pair of shafts 34 carrying brushes 35. There are two sets of brushes connected to each shaft, these brushes extending in opposite directions. The brushes have a rotative movement in the direction of the arrows in Figure 5 so that they sweep upward against the leaves of the plant. These brushes have their long bristles about 10" in actual practice and these bristles are sufficiently soft or flexible that they will not injure the plants when striking them but will simply give a brushing action to the plants to detach and sweep off the insects on the leaves thereof. The shafts 34 upon which the brushes are located carry at their ends the beveled gear wheels 36, which in turn are driven by beveled gea wheels 37 mounted upon vertical shafts 38 mounted in the supporting frame of the machine, these shafts 38 at their upper end having beveled gear wheels 39 engaged by beveled gear wheels 40 mounted upon a transverse shaft 41. This transverse shaft 41, as illustrated in Figure 2, carries a belt wheel 42 driven by a belt 43 from a hand wheel 44 mounted upon the shaft 16. Any other suitable driving mechanism may be used, however, and I do not wish to be limited to this particular system of driving.

Preferably the frame 10 is composed of two sections, the rear section A being pivoted at 45 to the front section B so that it may be raised or lowered. The rear end of the section A is provided at one side with a downwardly projecting portion 46 having a link 47 which connects to a lever 48 mounted to operate over a sector 49 and to be engaged at any point with this sector. By forcing the lever 48 forward, the rear end of the section A will be raised, and by forcing the lever 48 rearward, the section A will be depressed. It will be obvious, therefore, that the brushes and the hoods and all that portion of the mechanism which is supported by the rear section A may be vertically adjusted so as to accommodate plants of various heights.

I have found in actual practice that it is particularly necessary to have a hood which will surround or partially surround the upper portions of the plants so that insects knocked from the plants by the brushes will not fall to the ground but will be sucked up into an adjacent tube or pipe 33. I have found that these small pipes 33 disposed at various points within the interior of the hood are particularly effective and far more effective than if the suction pipe 29, which has a relatively large diameter, opened into the hood. The pipes 33 are, of course, of such size as to accommodate potato bugs and plant lice and they are disposed at various heights and at different portions of the hood so as to receive the insects knocked off in various directions from the plants by the brushes. I have found also in practice that the brushes are particularly desirable as a means for agitating the plants, as they do not injure the plants, which rigid agitators would do. I do not wish to be limited to the particular means for driving the exhaust fans, as it is obvious that other means might be used, nor do I wish to be limited to the particular driving system. The brushes are to be rotated at a relatively low rate of speed and the fan at a relatively high rate of speed.

I claim:—

1. An insect destroyer of the character described comprising a supporting frame having traction wheels, an exhaust fan mounted thereon having a casing, an outlet pipe from the casing, a suction pipe leading from the casing and extending downward, a hood into which the suction pipe extends, the hood being adapted to straddle a row of plants, a plurality of pipes leading from the suction pipe to various portions of said hood, and oppositely rotating brushes mounted within the hood.

2. An insect destroyer of the character described comprising a supporting frame having traction wheels, an exhaust fan mounted thereon having a casing, an outlet pipe from the casing, a suction pipe leading from the casing and extending downward, a hood into which the suction pipe extends, the hood being adapted to straddle a row of plants, a plurality of pipes leading from the suction pipe to various portions of said hood, oppositely rotating brushes mounted within the hood, and means actuated by the traction wheels of the machine for rotating the brushes in opposite directions.

3. In an insect destroyer of the character described, a supporting frame, traction wheels thereon, an exhaust fan including an exhaust fan casing, the casing having an outlet and a receptacle connected thereto, a suction pipe leading from the casing and extending rearward and then downward, a hood into which the suction pipe extends, the hood having end walls cut away to straddle a row of plants, a plurality of pipes leading from the suction pipe into the interior of the hood and opening at different portions of the hood, a pair of shafts passing through the hood parallel to the line of draft of the machine, brushes mounted upon said shafts, the brushes having a length equal to the length of the hood, and means for rotating the brushes in opposite directions and in a direction to cause those bristles projecting toward the middle of the hood to sweep upward.

4. In an insect destroyer of the character described, a supporting frame, traction wheels thereon, an exhaust fan including a suction fan casing, the casing having an outlet and a receptacle connected thereto, a suction pipe leading from the casing and extending rearward and then downward, a hood into which the suction pipe extends, the hood having end walls cut away to straddle a row of plants, a plurality of pipes leading from the suction pipe into the interior of the hood and opening at different portions of the hood, a pair of shafts passing through the hood parallel to the line of draft of the machine, brushes mounted upon said shafts, the brushes having a length equal to the length of the hood, means for rotating the brushes in opposite directions and in a direction to cause those bristles projecting toward the middle of the hood to sweep upward, said brush operating means including a shaft operatively driven from the traction wheels of the machine, and operative connections between said shaft and the brush shafts.

5. An insect destroyer of the character described comprising a supporting frame having traction wheels, the frame having a forward and rear section pivoted to each other, means for raising and lowering the rear section of the frame, an exhaust fan mounted upon the frame and driven from the traction wheels and including a fan casing having an outlet and a receptacle engaged therewith, a suction pipe leading into the fan casing, the rear end of the suction pipe being downwardly extended, a hood mounted upon the suction pipe cut away at its forward and rear ends to straddle a row, a pair of brushes disposed within the hood on each side of the cut away portion thereof, and means operated by the traction wheels of the machine for rotating said brushes in reverse directions.

6. An insect destroyer comprising a supporting frame, traction wheels thereon, a pair of exhaust fans, each including a casing, a shaft entering said casing and carrying fan blades, means for operatively connecting said shaft to the traction wheels, each casing having an outlet, receptacles connected to the outlet of each casing, a pair of suction pipes each formed in two flexibly connected sections and each suction pipe opening into one of said casings, each suction pipe extending rearward and downward, a hood connected to each suction pipe having its forward and rear ends cut away to straddle a row of plants, small suction pipes leading into the main suction pipes and opening at various points in the interior of each hood, a pair of agitating brushes disposed on each side of the hood, and means operated by the traction wheels of the machine for rotating said brushes.

In testimony whereof I hereunto affix my signature.

FREDERICK W. BENDER.